US005772180A

United States Patent [19]

Palma et al.

[11] Patent Number: 5,772,180

[45] Date of Patent: Jun. 30, 1998

[54] ELECTROMAGNETIC VALVE FOR AUTOMOTIVE VEHICLE

[75] Inventors: Rodolfo Palma, Canton; Michael Benjamin Levin, Bloomfield, both of Mich.

[73] Assignee: Ford Global Technologies, Inc., Dearborn, Mich.

[21] Appl. No.: 784,697

[22] Filed: Jan. 16, 1997

[51] Int. Cl.[6] .................................................... F16K 31/06

[52] U.S. Cl. ...................................... 251/129.15; 335/279

[58] Field of Search .................................... 335/255, 279, 335/281; 251/129.15, 129.01; 239/585.5, 585.1, 585.3

[56] References Cited

U.S. PATENT DOCUMENTS

| | | | |
|---|---|---|---|
| 3,157,831 | 11/1964 | Ray . | |
| 4,232,830 | 11/1980 | Casey et al. | 239/585.5 |
| 4,327,345 | 4/1982 | Kelso et al. . | |
| 4,390,158 | 6/1983 | Lang | 251/129.15 |
| 4,546,955 | 10/1985 | Beyer et al. . | |
| 4,666,087 | 5/1987 | Jaggle et al. | 239/585.3 X |
| 4,783,049 | 11/1988 | Northman et al. . | |
| 4,812,884 | 3/1989 | Mohler . | |
| 4,984,549 | 1/1991 | Mesenich | 251/129.15 X |
| 5,281,939 | 1/1994 | Juds et al. . | |
| 5,422,617 | 6/1995 | Brown . | |

*Primary Examiner*—Kevin Lee
*Attorney, Agent, or Firm*—Jerome R. Drouillard

[57] ABSTRACT

An electromagnetically actuated valve for an automotive vehicle includes a pole assembly having a coil situated therein and a combination valve element and armature, including a tubular axially moveable valve spool for controlling the flow through at least one inlet port and at least one outlet port. A magnetic head having a first end attached to an end of the valve spool and a second end nested within a relieved area provided in the pole assembly functions to move the tubular valve spool in response to magnetic flux induced by the coil.

6 Claims, 3 Drawing Sheets

ELECTROMAGNETIC VALVE FOR AUTOMOTIVE VEHICLE

BACKGROUND OF THE INVENTION

1. Field of the Invention

The present invention relates to a electromagnetic valve for use in automotive vehicles.

2. Discussion of Related Art

Electromagnetically operated valves, although used somewhat in automotive vehicles, have traditionally required too much power to be of use in more demanding applications such as cylinder valves, transmission controls, and injectors suitable for the direct injection of fuel into an engine's cylinders. U.S. Pat. No. 4,783,049, discloses an electrically operated automatic transmission controller assembly having a magnetic flux path which does not provide an optimum flux field characteristic because the flux is constricted at the points at which is passes to and from the movable armature. A valve according to present invention overcomes deficiencies of the prior art, including the valve described in the '049 patent.

SUMMARY OF THE INVENTION

An electromagnetically actuated valve for an automotive vehicle includes a pole assembly having a coil situated therein, with the pole assembly being generally cylindrical and having a generally annular relieved area formed in one end thereof. As used herein, the term "generally cylindrical" refers to either a circular cylinder or a cylinder having either a square or rectangular right cross section. A combination valve element and armature situated within the electromagnetically actuated valve includes a tubular slidable valve spool mounted within the valve body, with the spool controlling flow through at least one inlet port and at least one outlet port formed in the valve body. A combination valve element and armature according to the present invention further includes a generally ring-shaped magnetic head having a first end attached to an end of the valve spool and a second end nested within the annular relieved area. The magnetic head preferably has a frustro-conical sectional configuration. A valve according to the present invention has an air gap comprising a continuous, biplanar annulus. The planes in the annulus make an acute angle with each other.

The present valve is advantageous because the combination valve element and armature are subjected to magnetic force components which act radially in a balanced arrangement and axially in an unbalanced arrangement upon the generally ring-shaped magnetic head. The substantially balanced magnetic force components acting radially inwardly and radially outwardly upon the generally ring-shaped magnetic head cause the present valve to operate with little friction, which means that the valve will have superior time response characteristics while consuming less power than other types of electromagnetically actuated valves.

The present valve offers a further advantage insofar as the valve's magnetic head is nested within the generally annular relieved area of the pole assembly to the extent that substantially all the magnetic flux generated within the coil passes through the magnetic head. Again, the effect of this is to render the present valve more efficient than other types of valves.

DETAILED DESCRIPTION OF PREFERRED EMBODIMENTS

Figure 1:
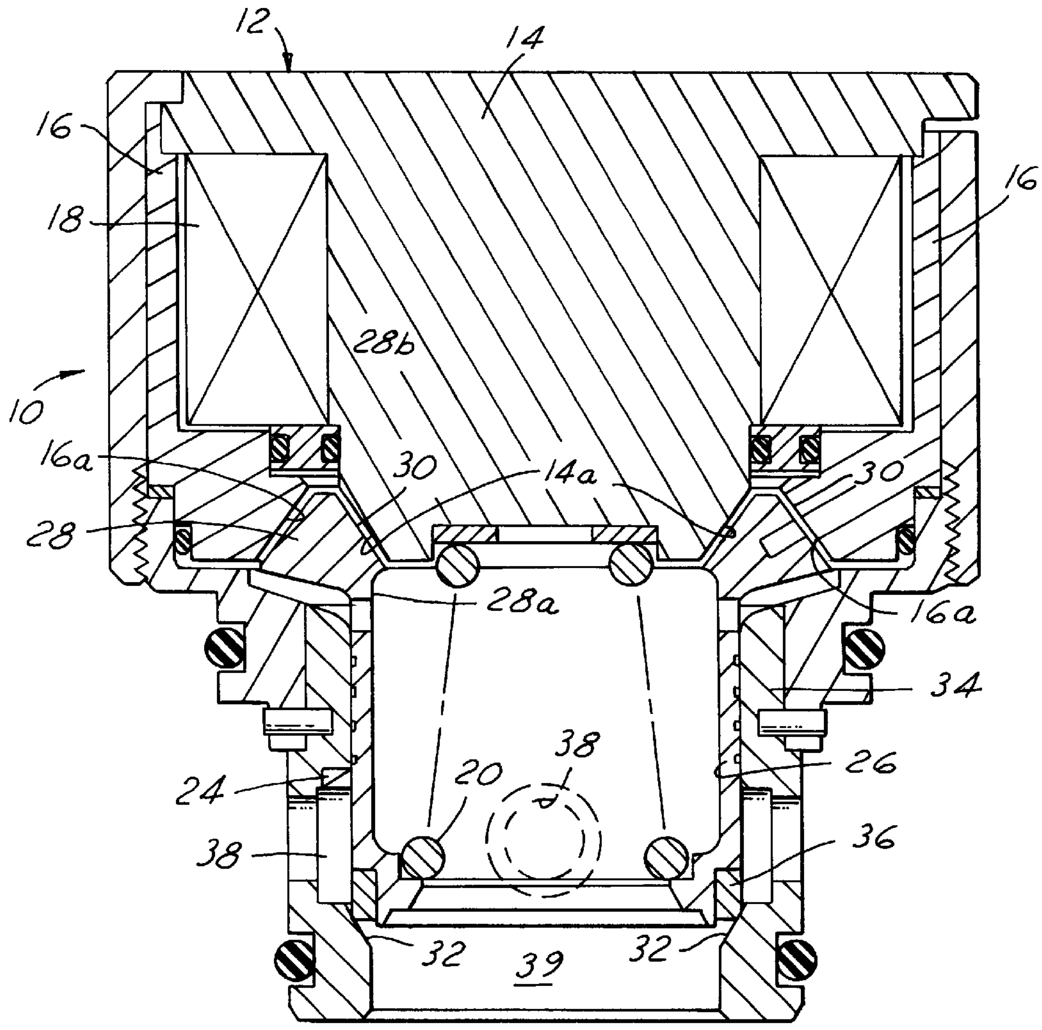
FIG. 1 is a sectional view of a valve according to the present invention.

As shown in FIG. 1, an electromagnetically actuated valve 10 includes pole assembly 12 comprised of inner pole piece 14 and outer pole piece 16. Taken together, the inner and outer pole pieces provide a path for magnetic flux which ultimately flows through magnetic head portion 28 of the armature of the present valve. Pole pieces 14 and 16 provide a nesting area for coil 18, which is wound about a portion of the periphery of inner pole piece 14. Both inner pole piece 14 and outer pole piece 16 extend axially past coil 18 in a direction toward the middle of valve 10. Both pole pieces have truncated faces, identified as surfaces 14*a* and 16*a*. Surfaces 14*a* and 16*a* define a generally annular relieved area, and the magnetic flux passes through this relieved area to interact with combination valve element and armature 24. Magnetic flux arising within coil 18 and passing through the annular relieved area defined by faces 14*a* and 16*a* passes through generally ring-shaped magnetic head 28, which has a first end 28*a* attached to tubular axially moveable valve spool 26, and a second end 28*b* which is nested within the relieved area defined by faces 14*a* and 16*a*. It is thus seen from FIG. 1 that air gap 30 is defined by surfaces 14*a*, 16*a*, and the facing surfaces of magnetic head 28. Those skilled in the art will appreciate, in view of this disclosure, that combination valve element and armature 24 could comprise an integral assembly or a composite construction in which, for example, magnetic head 28 is comprised of a ferrous material and valve spool 26 comprises a nonmetallic material, such as a plastic composition. Those skilled in the art will further appreciate that a valve according to the present invention could use other types of valve elements in lieu of the illustrated spool design. More specifically, it would be possible to use a poppet or plug type of valve element.

Figure 3:
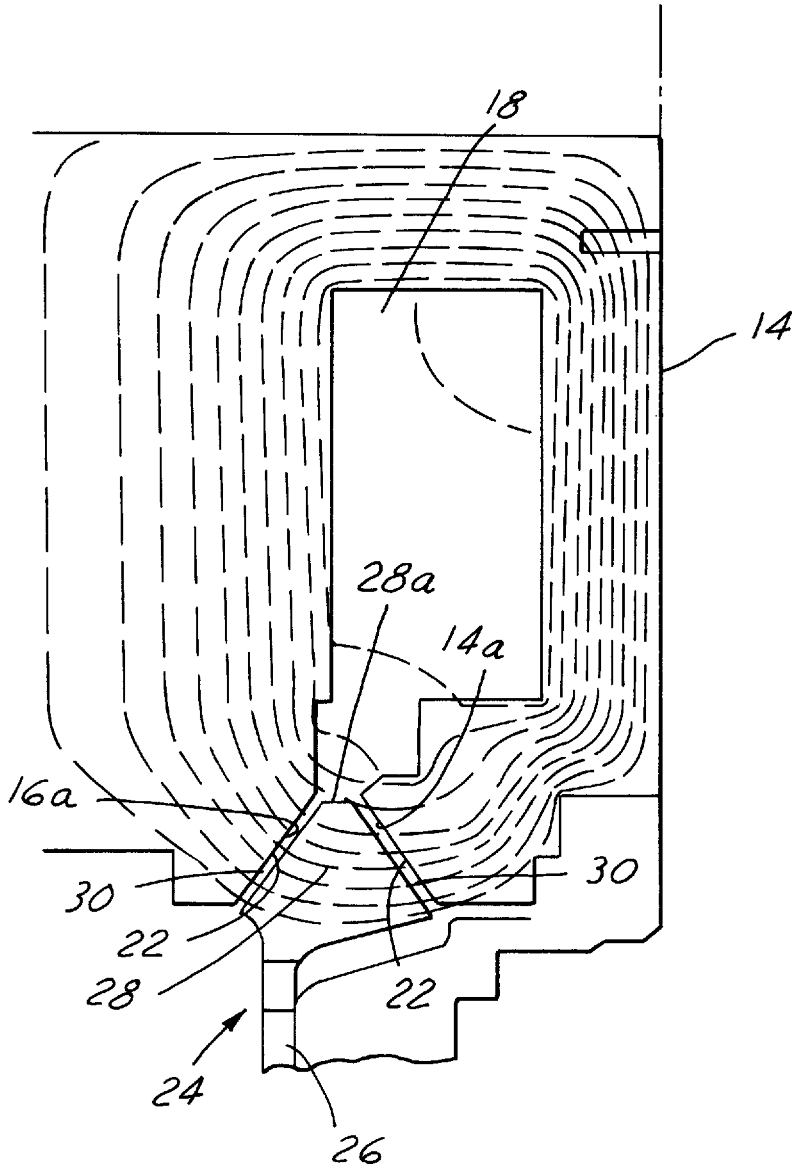
FIG. 3 illustrates magnetic flux flow in a valve according to the present invention.

FIG. 3 illustrates the magnetic flux pattern through one-half of a valve structure according to the present invention. This flux pattern was determined by using finite element methods which are beyond the scope of the present invention. It should be noted that the lines of flux are allowed to freely flow into and out of magnetic head 28 in a manner not seen with prior art valves. This factor, which contributes materially to the low power consumption of a valve according to the present invention, arises from the generously sized flux paths in the area of faces 14*a* and 16*a* and the corresponding faces of magnetic head 28. As a whole, the annular air gap arrangement and underlying pole pieces cause relatively little restriction to the magnetic flux, thereby providing a very efficient magnetic device.

When coil 18 is energized, magnetic head 28 and valve spool 26 are moved toward coil 18, with the result that sealing element 36 will be unseated from valve seat 32, so as to allow fluid to flow through inlet ports 38, through the interior of spool 26, and then out through outlet port 39. Pin 31 prevents magnetic head 28 from moving too close to coil 18.

Whenever coil 18 is not energized, spring 20 will maintain spool 26 and sealing element 36 firmly in contact with valve seat 32.

In contrast with prior art designs, the air gap in a valve according to the present invention comprises a continuous, biplanar annulus, with the planes in the annulus making an acute angle with each other. This is beneficial because the combination valve element and armature 24 is subjected to magnetic force components acting both radially in a balanced arrangement and axially in an unbalanced arrangement, with the magnetic force components acting upon generally ring-shaped magnetic head 28. Moreover, those skilled in the art will appreciate in view of the present invention that the ring-shaped magnetic head may be constructed with the planes of the annulus making another type of angle other than an acute angle with each other.

Figure 4:
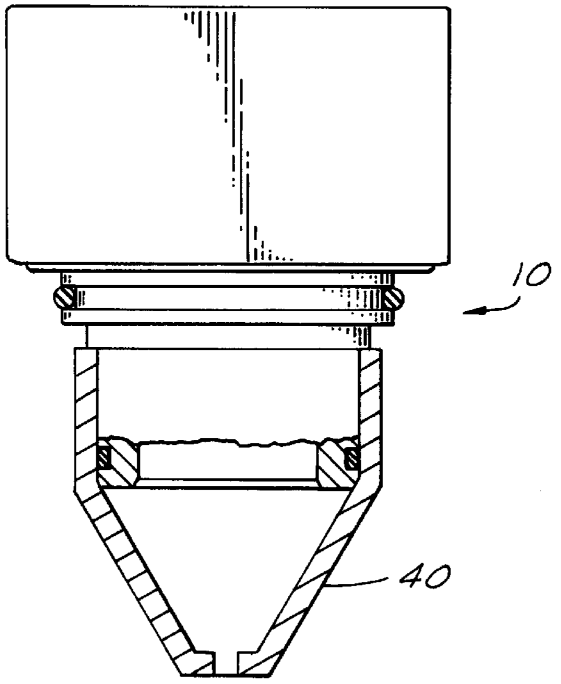
FIG. 4 illustrates an injector tip useful with a valve according to the present invention.
Figure 5:
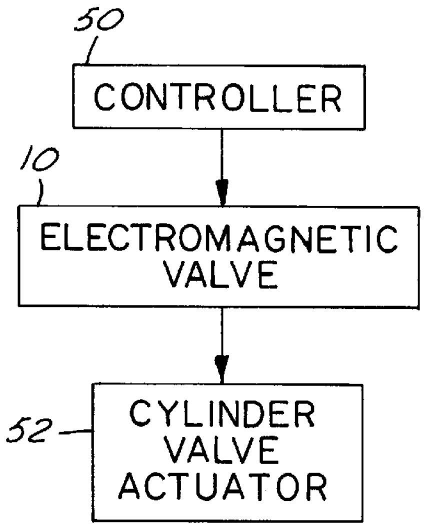
FIG. 5 is a block diagram illustrating usage of a valve according to the present invention to control an engine cylinder valve.

A valve according to the present invention may beneficially be used for operating a fuel injector for an internal combustion engine as shown in FIG. 4. Here, nozzle 40 is applied to the lower portion of the present valve such that upon receipt of a signal from an electronic engine control device selected from those known by those skilled in the art of engine controls, fuel may be sprayed into an engine's cylinders according to a pulse width modulation control combined with the present valve. The present valve may also be employed for operating cylinder valves according to the block diagram of FIG. 5, wherein engine controller 50, again selected from known controllers, is used to operate the present valve 10 and then to control cylinder valve actuator 52 which may, for example, comprise a hydraulic actuator known to those skilled in the art and suggested by this disclosure, or yet another hydraulic cylinder valve operator known to those skilled in the art and suggested by this disclosure.

In any event, a valve according to the present invention will have a beneficial configuration including a magnetic head having a conical section nesting within a generally annular relieved section defined by inner and outer pole pieces of the valve. The present valve is very efficient because substantially all of the magnetic flux generated when coil 18 is energized passes through magnetic head 28.

Figure 2:
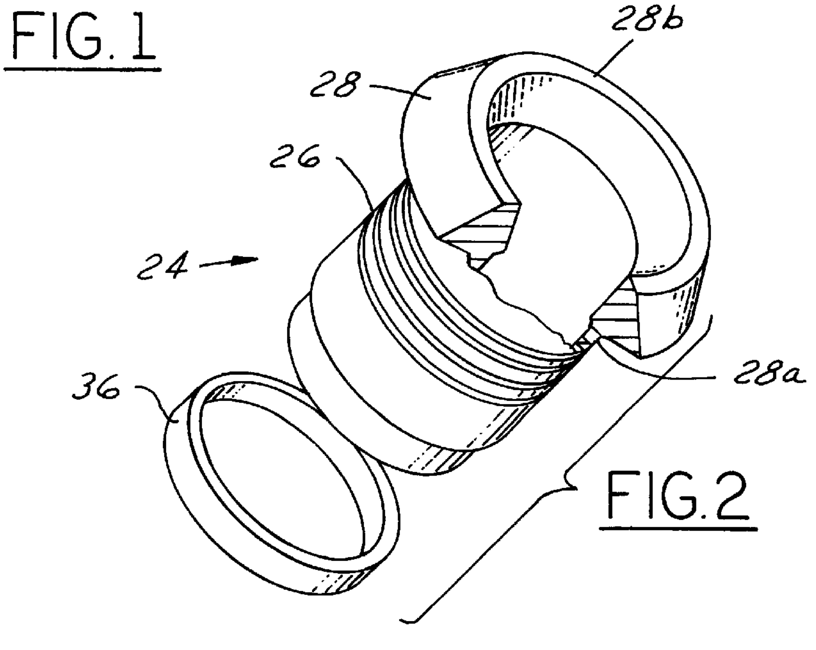
FIG. 2 is a perspective view of a combination valve element and armature suitable for use with the valve of FIG. 1.
Figure 6:
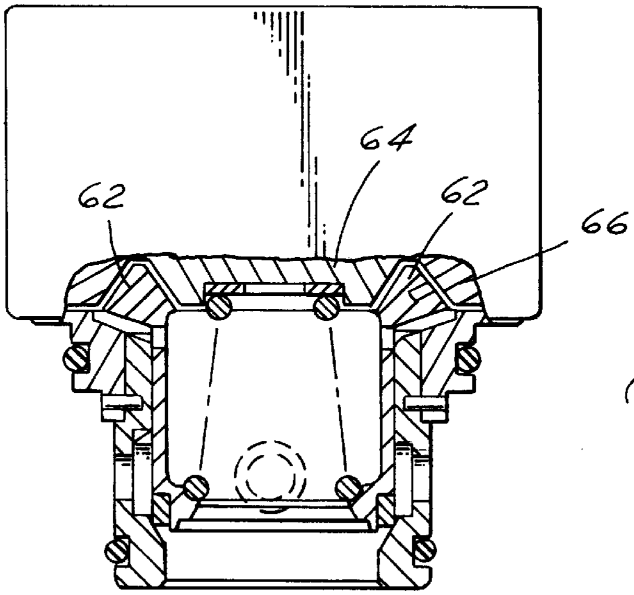
FIG. 6 is an alternate embodiment of a valve according to the present invention.
Figure 7:
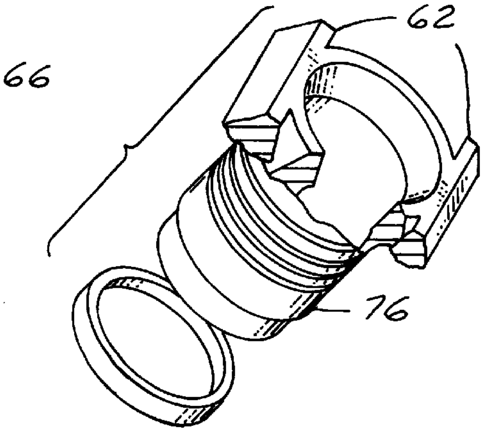
FIG. 7 is a combination armature and valve element suitable for use with the valve of FIG. 6.

FIGS. 6 and 7 illustrate an alternate embodiment of a valve according to the present invention. Magnetic head 28 of the embodiment of FIG. 2 comprises two armature bars 62, which nest into corresponding trapezoidal cross-section relieved areas formed by the inner pole piece 64 and outer pole piece 66, which are generally rectangular, if not square in their configuration. Linear armature bars 62 have axes perpendicular to the central axis of valve spool 76. And, the axes of the individual armature bars are parallel to each other.

With the construction shown in FIGS. 6 and 7, pole pieces 64 and 66 may be fabricated of laminated ferrous metal, such as soft iron, in a manner similar to that done with transformer cores. This type of construction will produce additional benefits in terms of lower power consumption and faster time response. Of course, laminated construction lends itself to noncircular pole configurations having square or rectangular cross-sections.

While the invention has been shown and described in its preferred embodiments, it will be clear to those skilled in the arts to which it pertains that many changes and modifications may be made thereto without departing from the scope of the invention.

We claim:

1. An electromagnetically actuated valve for an automotive vehicle, said valve comprising:

- a pole assembly having a coil situated therein, with said pole assembly being generally cylindrical and having a generally annular relieved area formed in one end thereof;
- an armature comprising:
  - a generally ring-shaped magnetic head having a first end attached to an end of a valve spool; and
  - a second end nested within said relieved area; and
- an air gap defined by facing surfaces of the generally annular relieved area and the generally ring-shaped magnetic head, with said air gap comprising a continuous, biplanar annulus, with the planes of the annulus making an acute angle with each other.

2. An electromagnetically actuated valve according to claim 1, wherein the planes of said air gap are arranged such that the combination valve element and armature is subjected to magnetic force components acting both radially in a balanced arrangement and axially in an unbalanced arrangement upon the generally ring-shaped magnetic head.

3. An electromagnetically actuated valve according to claim 1, wherein the planes of said air gap are arranged such that the combination valve element and armature is subjected to unbalanced axially directed magnetic force and substantially balanced magnetic force components acting both radially inwardly and radially outwardly upon the generally ring-shaped magnetic head.

4. An electromagnetically actuated valve according to claim 1, further comprising a controller for energizing the valve coil in response to a signal to open an engine cylinder valve operated hydraulically by the electromagnetically actuated valve.

5. An electromagnetically actuated valve for an automotive vehicle, said valve comprising:

- a pole assembly having a coil situated therein, with said pole assembly having a generally rectangular section configuration and having two generally trapezoidal relieved areas formed in one end thereof; and
- a combination valve element and armature comprising a tubular valve spool having a central axis, with said spool slidably mounted within a valve body, with said spool controlling flow through at least one inlet port and at least one outlet port formed in the valve body, with said combination valve element and armature further comprising a magnetic head having a first end attached to an end of said valve spool and a second end nested within said relieved areas, with said magnetic head having a pair of linear armature elements having axes which are perpendicular to the central axis of the valve spool.

6. An electromagnetically actuated valve according to claim 5, wherein said magnetic head is nested within said generally annular relieved area to an extent that substantially all of the magnetic flux generated when the coil is energized passes through the magnetic head in a substantially perpendicular array relative to the surfaces of the said relieved areas.

* * * * *